United States Patent [19]

Armbruster et al.

[11] Patent Number: 5,710,971
[45] Date of Patent: Jan. 20, 1998

[54] RADIO COMMUNICATION NETWORK AND METHOD FOR UNOBSTRUSIVE CALL INTERCEPTION VIA DATA DUPLICATION

[75] Inventors: Peter Joseph Armbruster, Tempe; Johanna Alexandra Wild, Scottsdale; Dean Paul Vanden Heuvel, Chandler; Scott David Blanchard, Mesa, all of Ariz.

[73] Assignee: Motorola, Inc., Schaumburg, Ill.

[21] Appl. No.: 574,060

[22] Filed: Dec. 18, 1995

[51] Int. Cl.[6] .............................. H04B 7/185; H04M 3/22
[52] U.S. Cl. .............................. 455/12.1; 379/35
[58] Field of Search .............................. 455/12.1, 13.1, 455/33.1, 54.1, 56.1, 422, 427; 370/316, 326, 477; 379/34, 35, 1, 58

[56] References Cited

U.S. PATENT DOCUMENTS

| | | | |
|---|---|---|---|
| 5,255,305 | 10/1993 | Sattar | 379/34 |
| 5,305,308 | 4/1994 | English et al. | 455/33.1 |
| 5,394,458 | 2/1995 | Allen et al. | 379/34 |
| 5,509,004 | 4/1996 | Bishop, Jr. et al. | 455/12.1 |
| 5,566,181 | 10/1996 | Huang et al. | 379/58 |

*Primary Examiner*—Reinhard J. Eisenzoph
*Assistant Examiner*—Sam Bhattacharya
*Attorney, Agent, or Firm*—Harold C. Mc Gurk

[57] ABSTRACT

A digital cellular telecommunication network (30) uses transcoders (50) which vocode voice using a maximal lossy compression algorithm which conserves spectrum usage. A call path for an intercepted call is looped from an outer space satellite (32) network into a terrestrial gateway (34). Compressed call data for each of two half-calls in this call path are duplicated at any of the network nodes and inserted into the opposing half-call. In addition, the compressed call data are decompressed in a gateway transcoder (50), combined in a conference bridge (90), and routed to a monitoring center (60). A subscriber unit (36), a second device (48), and the monitoring center (60) all receive call data which has experienced only one compression/decompression cycle.

17 Claims, 4 Drawing Sheets

RADIO COMMUNICATION NETWORK AND METHOD FOR UNOBTRUSIVE CALL INTERCEPTION VIA DATA DUPLICATION

TECHNICAL FIELD OF THE INVENTION

The present invention relates generally to telecommunications. More specifically, the present invention relates to the unobtrusive interception of calls in which compressed call data are being communicated.

BACKGROUND OF THE INVENTION

Many countries have call interception or wire-tap laws. From time to time, such laws require the telecommunication service provider to unobtrusively intercept specified calls taking place within a country's jurisdiction. However, in wireless telecommunication networks, and particularly in digital cellular telecommunication networks, true unobtrusive interception is often difficult to achieve or is achieved by wasteful use of the electromagnetic spectrum.

FIG. 1 shows a block diagram which illustrates call interception in a prior art Global System for Mobile communications (GSM) digital cellular radio telecommunication network. In this prior art network, subscriber unit (SU) 10 engages in digital RF communication with base transceiver station (BTS) 12 during a call. BTS 12 is physically located on or near the surface of the earth within radio range of SU 10. BTS 12 passes the communication through base station controller (BSC) 14 to a nearby mobile switching center (MSC) 16 where two half-calls are connected together. Moreover, for a vast majority of calls, call paths to SU 10 in a country's jurisdiction pass through MSC 16 which is also in the country's jurisdiction.

Worldwide telephony networks convey a single digital voice communication using the well known DS-0, 64 kbps, PCM standard. This standard protocol allows an accurate reconstruction of voice band analog signals. However, this standard protocol does not meet the needs of wireless communication because the dedication of outgoing and incoming 64 kbps channels to each call wastes the scarce electromagnetic spectrum which must be shared by all who use it. Consequently, digital wireless networks prefer to compress voice communication and transmit the communication at a lower data rate through a narrower bandwidth RF channel to conserve the spectrum.

Lossless compression would be a highly desirable form of data compression because it would permit expansion or decompression to precisely reconstruct an original data stream. However, lossless compression typically achieves only a modest reduction, for example less than 50%, in data quantity, data rate, and channel bandwidth. Accordingly, wireless telecommunication networks typically prefer to use a form of lossy data compression to achieve greater reductions in data quantity, data rate, and channel bandwidth.

Wireless telecommunication networks often employ the use of transcoders or vocoders to analyze human speech at a source node using sophisticated modeling techniques which reflect human speech capabilities. Transcoders compress voice using lossy compression techniques. Well known speech analysis techniques allow digitized speech of acceptable quality to be transported at data rates much lower than 50% of the DS-0 rate. Thus, the prior art network depicted in FIG. 1 uses a 13 kbps data rate for RF links. The use of lower data rates than DS-0 permits the telecommunication network to transport more human speech in the form of calls in a given geographical area using a given amount of spectrum. However, the lossy nature of these compression techniques prevents precise reconstruction of original voice signals.

As illustrated in FIG. 1 for a conventional wireless telecommunication network, a wireless half-call is routed through a high quality (HQ) transcoder 18 for decompression. Decompressed voice communication from two half-calls are connected together in MSC 16. When the call is to be intercepted, this connection is formed through conference bridge 20. A third port of conference bridge 20 provides combined, decompressed voice communication from the two half-calls for routing to a monitoring center, as illustrated at call path 22.

MSC 16 couples to the wire-based public switched telecommunications network (PSTN). A vast majority of communication with a typical SU 10 is conducted with telephonic devices coupled to the PSTN through call path 24. Less often, SU 10 communicates with SU 11 supported by the same or other BSCs 14. When a second half-call is associated with SU 11, the second call path is routed through another HQ transcoder 18 for recompression prior to RF transport to SU 11. The quality of communication suffers when SU 10 communicates with SU 11 because two compression/decompression cycles are experienced. Since reconstruction of an original signal after a single compression/decompression cycle is not precise, reconstruction of an original signal after two sequential compression/decompression cycles is even less precise. However, since HQ transcoders are employed, only a minor signal quality degradation results from two compression/decompression cycles. Whether or not SU 10 is communicating with another SU 11 or with a telephonic device coupled through the PSTN, the signal quality is the same as it would be whether or not the call is being intercepted. Thus, calls are 40 intercepted unobtrusively.

This conventional wireless communication network undesirably wastes the spectrum due to its reliance upon HQ transcoders. While HQ transcoders permit significant reductions over DS-0 rates, they fall far short of implementing maximal lossy compression and decompression algorithms. Maximal lossy voice compression and decompression algorithms are well known. Such algorithms permit the transmission of acceptable quality voice communication at data rates as low as 2.4 kbps. However, signal reconstruction after two compression/decompression cycles is noticeably inferior to signal reconstruction after one compression/decompression cycle. The prior art telecommunication network avoids using maximal lossy compression, at least in part, because the double compression/decompression cycles would yield unacceptably low quality voice signals.

In addition, the prior art wireless communication network is undesirable because it requires completion of a compression/decompression cycle for each SU half-call prior to connecting half-calls together in an MSC, whether or not the call will be intercepted. This requirement causes the prior art telecommunication network to avoid maximal lossy compression. However, in a network which uses maximal lossy compression to achieve improved spectrum usage, additional compression/decompression cycles are avoided to maintain reconstructed voice signal quality. In such a network call interception could become obtrusive rather than unobtrusive if additional compression/decompression cycles were required to intercept a call.

DETAILED DESCRIPTION OF THE DRAWINGS

Figure 1:
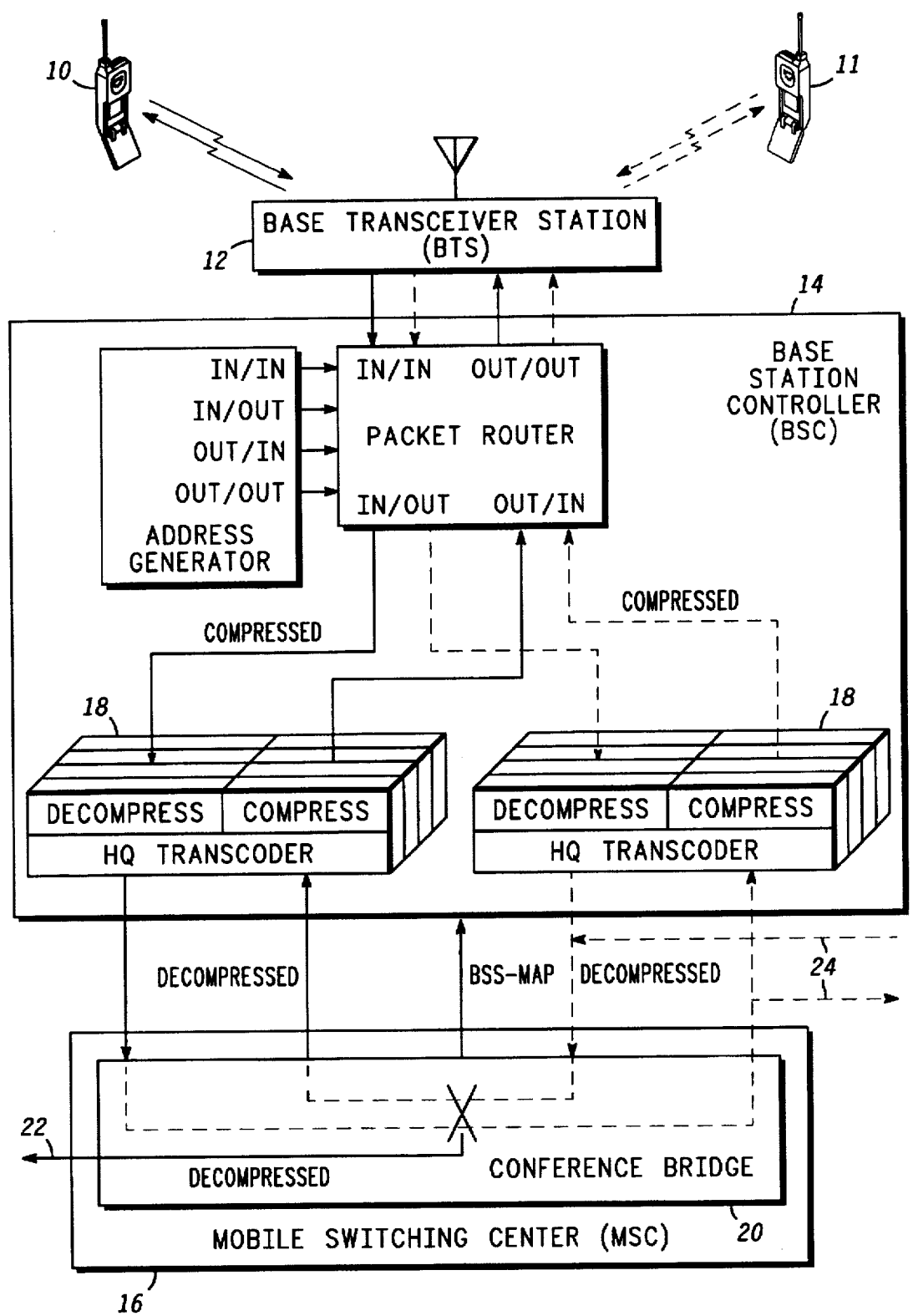
FIG. 1 shows a block diagram which illustrates call interception in a prior art GSM digital cellular radio telecommunication network.
Figure 2:
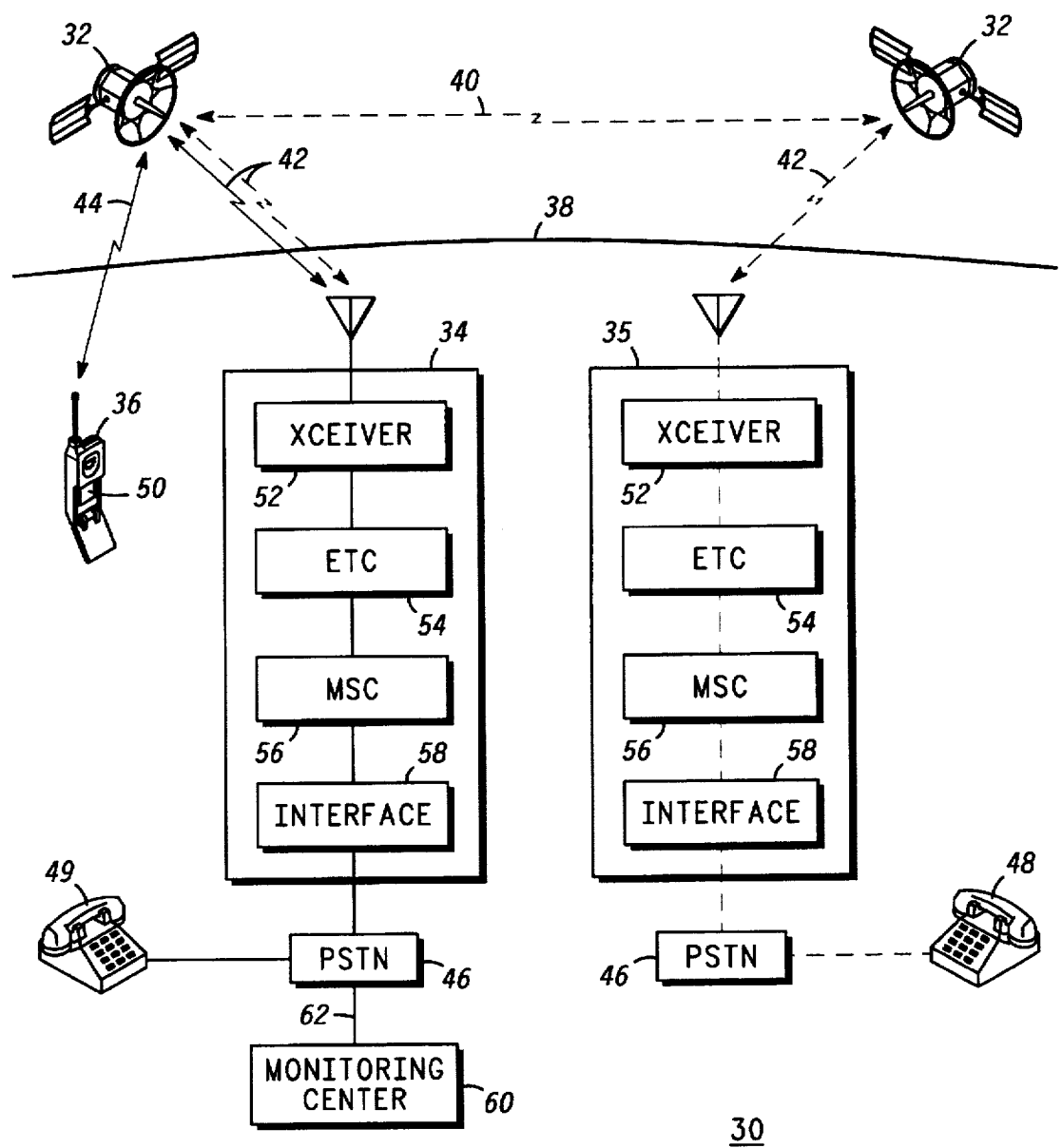
FIG. 2 shows a block diagram of a radio telecommunication network according to a preferred embodiment of the present invention.

FIG. 2 shows a schematic representation of digital, cellular communication network 30. In the preferred embodiment, network 30 includes satellites (SVs) 32, gateways 34, and subscriber units (SUs) 36. Satellites 32 are located in outer space while gateways 34 and subscriber units 36 reside on or near the surface 38 of the earth. Each satellite 32 has its own coverage area which extends over only a fraction of earth's surface 38. This coverage area is approximately the region of surface 38 that is within a line-of-sight view of satellite 32 at any given instant. Satellites 32 are or may be in radio communication with other satellites 32 that are in-view over RF communication trunks 40, with in-view gateways 34 over RF communication trunks 42, and in-view subscriber units 36 over radio links 44.

As presently preferred, sixty-six satellites 32 are arranged in a constellation of eleven, low earth, polar orbits, but this is not a requirement. FIG. 2 shows only two of these satellites 32 for convenience. Antennas (not shown) on satellites 32 form patterns projected toward the earth that define cells (not shown) through which cellular communication services are offered to subscriber units 36. Cellular communication services are provided through subscriber units 36 from any point on the earth covered by a cell, and a blanket of cells desirably covers substantially the entire earth. Network 30 may include any number of subscriber units 36.

Likewise, network 30 may include any number of gateways 34. However, network 30 may desirably deploy gateways 34 in accordance with geopolitical jurisdictions and include many fewer gateways 34 than subscriber units 36. Gateways 34 couple network 30 with local public switched telecommunication networks 46 and the multitude of telephonic devices 48 that couple thereto. In addition, gateways 34 hold and employ a large portion of the intelligence required to operate network 30.

Satellites 32 and gateways 34 represent network nodes which are switching centers for network 30. Each network node receives incoming signals from any of a plurality of origins and switches the incoming signals to any of a plurality of destinations. In the preferred embodiments, these signals may be in the form of digital packets which convey call data. The purpose of network 30 is to communicate the information represented by these call data.

Subscriber units 36 and gateways 34 include transceivers or vocoders 50 to transform analog audio signals into digital packets and vice-versa. Transcoders 50 located within gateways 34 are discussed below in connection with FIG. 3. Each transcoder 50 may include both a voice coder to compress voice call data and a voice decoder (not shown) to decompress compressed call data. A substantially continuous stream of communication data packets are required to support a communication path with subscriber unit 36. Standard transcoders 50 in network 30 implement well known maximal lossy compression vocoding algorithms. For the purposes of the present invention, maximal lossy compression of voice information occurs when the compressed voice can be represented by a stream of data at a data rate of less than 6.4 kbps, or 1/10 of the DS-0 rate. In the preferred embodiment, transcoders 50 compress and decompress voice at a 2.4 kbps rate. The use of maximal lossy compression is highly desirable because it allows more calls to be conveyed by a given amount of spectrum in a given area when compared to non-maximal lossy or lossless compression.

Each gateway 34 includes transceiver 52 which directly communicates with satellites 32 over RF communication trunk 42. Transceiver 52 couples to earth terminal controller (ETC) 54, which couples to mobile switching center (MSC) 56. As will be discussed in more detail below, transcoders 50 are implemented within gateway 34 in ETC 54. A PSTN interface 58 couples to mobile switching center 56 and directly communicates with PSTN 46.

In the preferred embodiment of the present invention, mobile switching centers 56 are similar to conventional mobile switching centers as used in the terrestrial-based Global System for Mobile telecommunications (GSM). Mobile switching centers 56 employ the intelligence needed to make connections between half-calls. Such connections are defined in a conventional manner. In addition, mobile switching centers 56 provide both basic and supplementary switching services as needed, again in a conventional manner.

Those skilled in the art will appreciate that basic services are concerned with exchanging information, such as voice communication, between two parties. Supplementary services augment basic services by, for example, allowing a user to participate in multiple connections simultaneously, to suspend information transfer on a connection without terminating it, to link other users to the same connection, to redirect connection establishment attempts toward another user or another service, and the like.

Gateways 34 and mobile switching centers 56 have a jurisdiction based upon geopolitical boundaries. Subscriber unit 36 resides within the jurisdiction of gateway 34 if its current location is within the geopolitical boundaries assigned to the gateway 34. When subscriber unit 36 is within the jurisdiction of mobile switching center 56, that mobile switching center 56 becomes involved in setting up and managing calls involving subscriber unit 36. For the purposes of the present invention, the other party to the call is referred to as a second device (SD). A half-call is associated with subscriber unit 36 and another half-call is associated with the second device. The figures illustrate a half-call associated with subscriber unit 36 using solid lines and a half-call associated with second device 48 with dotted lines.

When mobile switching center 56 determines that the second device half-call it is being asked to connect resides within its jurisdiction through PSTN 46, it routes a second device communication path through interface 58 toward PSTN 46 and second device (SD) 49. When mobile switching center 56 determines that the second device half-call does not reside within its jurisdiction through PSTN 46, the call path is not routed through gateway 34 when basic services are being requested.

Rather, for basic services the call path is switched as needed in satellites 32 and routed to the earth only as needed to link up with second device 48. In a space-based network, such as network 30, a call path is not necessarily required to extend to gateway 34 residing in a country where interception has been requested. As illustrated in FIG. 2, second device 48 may be reached through another gateway 35 rather than gateway 34 that services the subscriber unit 36 involved in the call. The omission of routing calls through gateways 34 conserves spectrum on RF trunks 42 while improving performance by omitting signal delay associated with switching through gateway 34. While FIG. 2 illustrates second devices 48 and 49 as being conventional telephonic devices coupled to PSTN 46, nothing prevents other subscriber units 36 from operating as second devices.

On the other hand, when mobile switching center 56 determines that the subscriber unit's call is to be intercepted, the call is treated, at least in part, as though supplementary services were being requested. In particular, the call path is routed through intercepting gateway 34 regardless of the location of second device 48. Those skilled in the art will appreciate that with the presence of a constellation of outer space satellites 32, call path routing for basic services would not need to include terrestrial network nodes, such as intercepting gateway 34. However in the preferred embodiment, network 30 routes the call path to intercepting gateway 34 within the jurisdiction of a country requesting a call intercept merely to accommodate the call intercept request. In an alternate embodiment, duplication occurs in serving satellite 32 and network 30 routes the duplicated traffic to intercepting gateway 34 within the jurisdiction of a country requesting a call intercept to accommodate the call intercept request.

The supplementary services form of call treatment causes the intercepted call to experience different routing and processing than a non-intercepted call experiences. However, the supplementary services form of routing and processing of the call path through intercepting gateway 34 exerts substantially no influence on the signal quality, and the interception is unobtrusive.

When a call to be intercepted is established between subscriber unit 36 and, for example, second device 48, subscriber unit 36 obtains call data from the user of subscriber unit 36 through a microphone or other input device. Subscriber unit 36 digitizes the user's voice and passes the resulting data through transcoder 50 to generate compressed call data. As discussed above, transcoder 50 performs a maximal lossy compression algorithm which allows the voice to be represented digitally in a stream of data having a data rate as low as 2.4 kbps.

Subscriber unit 36 transmits the compressed call data to serving satellite 32 which in turn routes the compressed call data to intercepting gateway 34 in whose jurisdiction subscriber unit 36 resides. The compressed call data are transmitted over a communication path that includes radio link 44 and RF communication trunk 42. As discussed in more detail below, the compressed call data are duplicated and processed through a conference bridge (not shown) in the intercepting and duplicating gateway 34 and passed both to monitoring center 60 over call path 62 and back toward satellite 32 over RF communication trunk 42. The compressed call data passed back to satellite 32 are transmitted onward through network 30 until they can be decompressed and delivered at second device 48. FIG. 2 illustrates an example wherein gateway 35 is in communication with second device 48 and performs this decompression operation.

Likewise, second device 48 obtains return call data from a user of that device and passes the return call data to gateway 35. Gateway 35 compresses the return call data into return compressed call data. These return compressed call data are transmitted through satellites 32 to the intercepting gateway 34. Duplication can be performed at either satellite 32 or gateway 34. Intercepting gateway 34 processes the return compressed call data through the conference bridge and routes return compressed call data both to monitoring center 60 and back toward subscriber unit 36 through satellites 32.

As discussed in more detail below, the processing of compressed call data and return compressed call data performed in intercepting and duplicating gateway 34 does not add a compression/decompression cycle to the communication path established between subscriber unit 36 and second device 48. Accordingly, network 30 uses maximal lossy compression in transmitting voice call data through RF communication links but refrains from performing more than one compression/decompression cycle even when a call is being intercepted. Consequently, signal quality in both reconstruction accuracy and signal delay is substantially unaffected, and call interception may be performed unobtrusively.

Figure 3:
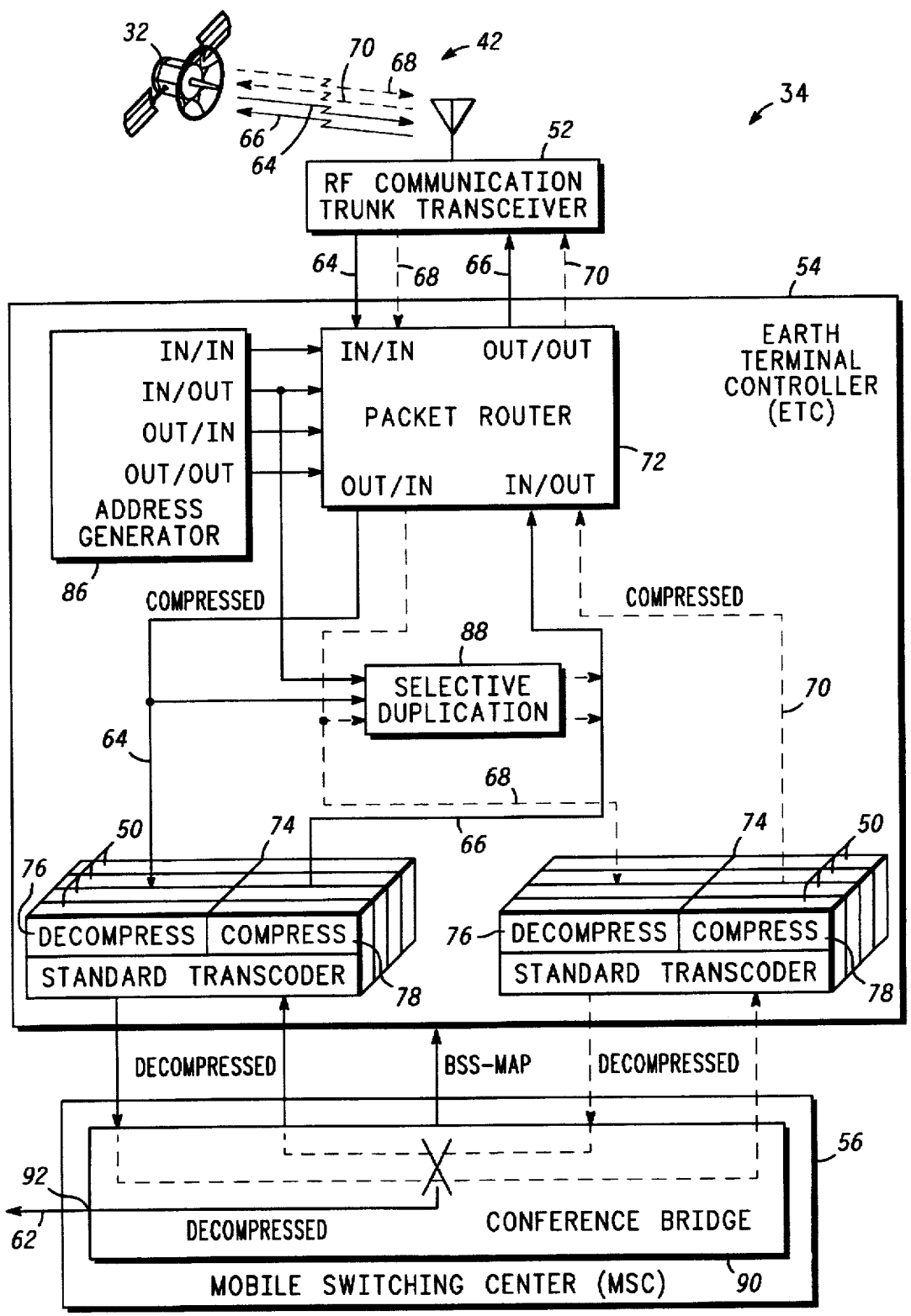
FIG. 3 shows a block diagram of a satellite and gateway portion of the network.

FIG. 3 shows a block diagram of satellite 32 and intercepting and duplicating gateway 34, hereinafter called duplicating node 34 of network 30. Gateway 35 has a similar structure, except that gateway 35 may omit the use of a conference bridge because call interception is performed in duplicating node 34 rather than gateway 35. Channel 64 of RF communication trunk 42 provides incoming compressed call data from subscriber unit 36 (see FIG. 2). Channel 66 of trunk 42 provides outgoing return compressed call data to subscriber unit 36. Channels 64 and 66 together support a subscriber unit half-call. Channel 68 of RF communication trunk 42 provides incoming return compressed call data from second device 48 (see FIG. 2). A channel 70 of trunk 42 provides outgoing compressed call data to second device 48. Channels 68 and 70 together support a second device half-call. RF communication trunk transceiver 52 terminates trunk 42 and connects channels 64, 66, 68, and 70 to earth terminal controller 54.

In earth terminal controller 54, channels 64 and 68 are routed from transceiver 52 to an input port of packet router 72 for data coming into duplicating node 34 (IN/IN). Channels 66 and 70 are routed to transceiver 52 from an output port of packet router 72 for data going out of duplicating node 34 (OUT/OUT). Packet router 72 is a conventional switching device which connects various channels at transceiver 52 with various transcoders 50 selected from transcoder banks 74. Transcoder banks 74 include any number of standard rate transcoders 50, and desirably include a sufficient number of transcoders to accommodate the maximum number of calls which can be processed by duplicating node 34. Each transcoder 50 includes decompress section 76 and compression section 78. While FIG. 3 illustrates one transcoder bank 74 being used for subscriber unit half-calls and another transcoder bank 74 being used for second device half-calls, this is not a requirement. As discussed above, standard rate transcoders 50 in network 30 provide maximal lossy compression, as opposed to high quality transcoders which avoid maximal lossy compression.

Identities of transcoders 50 are specified to packet router 72 for data flowing into duplicating node 34 (OUT/IN) and for data flowing out from duplicating node 34 (IN/OUT). Those skilled in the art will appreciate that packet router 72 may be viewed as a collection of buffers, and that connections are made by specifying buffer addresses in accordance with a time and/or space switching matrix scheme. Accordingly, address generator 86 is programmed to accommodate connections through packet router 72. Address generator 86 specifies addresses for buffers used by IN/IN, IN/OUT, OUT/IN, and OUT/OUT ports of packet router 72 in accordance with base station system management part (BSS-MAP) like instructions provided by mobile switching center 56. BSS-MAP represents a well known instruction protocol used in GSM.

Selective duplication section 88 monitors compressed call data and return compressed call data flowing into decompress sections 76 of transcoders 50 from the OUT/IN port of packet router 72. Such compressed call data are associated with specific calls by monitoring IN/OUT addresses generated by address generator 86. Selective duplication section 88 duplicates or copies the compressed call data and return compressed call data when a call is being intercepted. Intercepted calls are identified to selective duplication section 88 via BSS-MAP like instructions provided by mobile switching center 56. The duplicated data replace or are otherwise inserted into data streams heading into packet router 72 from compress sections 78 of transcoders 50. In particular, duplicated compressed call data incoming for the subscriber unit half-call are placed in an output buffer of packet router 72 allocated to outgoing compressed call data for the second device half-call, and duplicated return compressed call data incoming for the second device half-call are placed in an output buffer of packet router 72 allocated to outgoing return compressed call data for the subscriber unit half-call. For intercepted calls, actual data output from compress sections 78 of transcoders 50 are ignored or otherwise written to dummy buffer locations within packet router 72.

Decompress sections 76 of transcoders 50 assigned to the intercepted call path decompress or expand the compressed and return compressed call data to generate decompressed and return decompressed call data, respectively. The decompressed call data may be generated at the DS-0 rate. The decompressed call data are routed to mobile switching center 56, and particularly to conference bridge 90 which is assigned to the intercepted call.

Within mobile switching center 56, the subscriber unit and second device half-calls are connected together in a conventional manner. Decompressed call data for the subscriber unit and second device half-calls are routed to compress sections 78 of transcoders 50 assigned to the call. Compress sections 78 may compress the decompressed call data or may omit compression. If the decompressed call data are recompressed, the resulting recompressed call data are ignored, such as being written to a dummy buffer of packet router 72. As discussed above, compressed call data and return compressed call data are duplicated and substituted in the half-calls for any data generated by compress sections 78 of transcoders 50. Accordingly, multiple compress/decompress cycles are avoided.

Third port 92 of conference bridge 90 generates combined decompressed call data. As is conventional through the operation of a conference bridge, incoming data from both half-calls are combined, and a combined signal is output at third port 92. However, for call interception, nothing requires a voice path from monitoring center 60 (see FIG. 2) to either of subscriber unit 36 or second device 48. Accordingly, a null or otherwise silent incoming signal is desirably provided (not shown) at an incoming portion of port 92 for call path 62 (see FIG. 2) to monitoring center 60.

Accordingly, a call is intercepted by decompressing the call data, combining the decompressed call data from both half calls in conference bridge 90, and routing the combined, decompressed call data toward monitoring center 60. However, selective duplication section 88 short-circuits a decompression/compression cycle so that the compressed call data received at subscriber unit 36 and second device 48 have not been decompressed and recompressed at duplicating node 34. Voice reconstruction quality remains the same as if call interception were not being performed, and delay associated with a decompression/compression cycle is avoided. Decompression for monitoring center 60 is performed at earth terminal controller 54 in duplicating node 34. Decompression for subscriber unit 36 is performed at subscriber unit 36, and decompression for second device 48 is performed in the call path formed between duplicating node 34 and second device 48, such as in gateway 35 (see FIG. 2). Accordingly, decompression operations for both half-calls and for monitoring center 60 are performed independently from one another.

Satellites 32 include a switching structure similar to packet router 72 and address generator 86. In an alternate embodiment, selective duplication section 88 may be located in satellite 32 so that communication channels from gateway 34 to satellite 32 may be utilized only for the duplicated traffic to the monitoring center.

Figure 4:
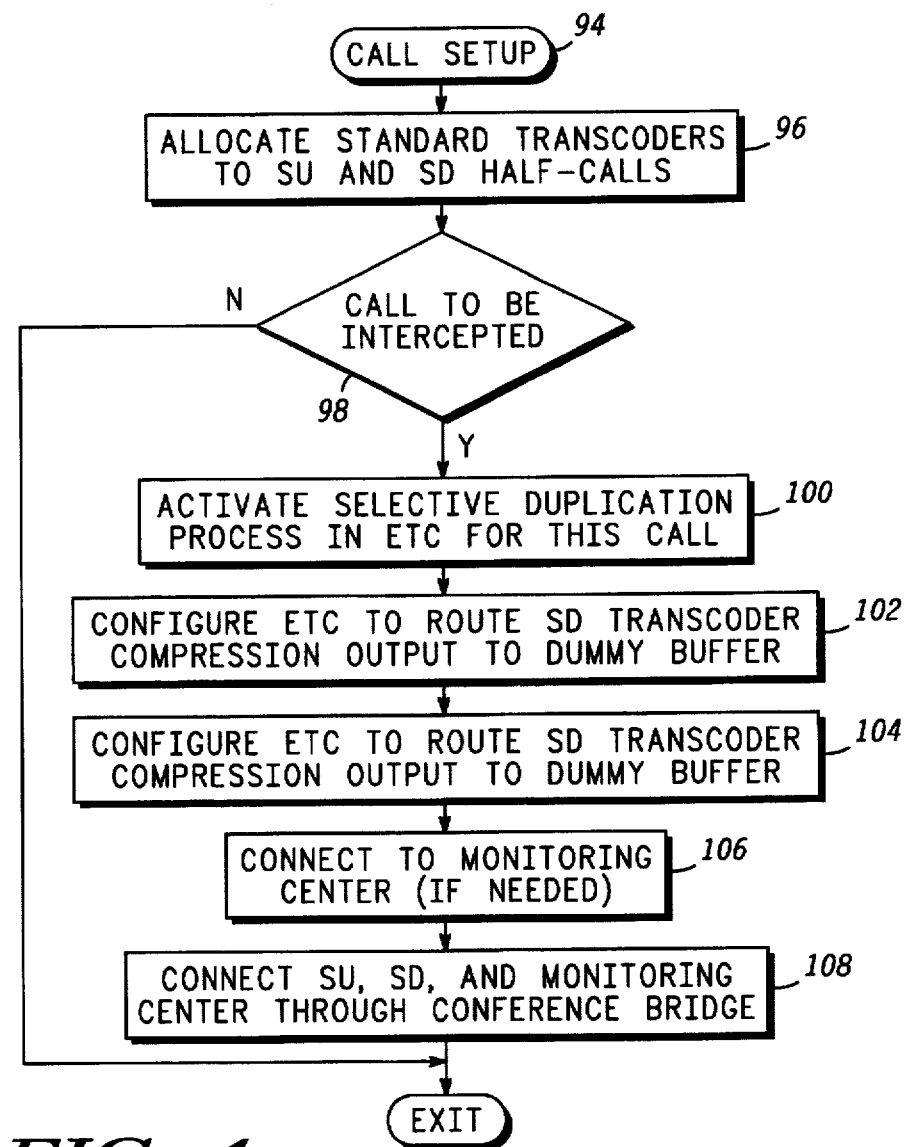
FIG. 4 shows a flow chart of a call setup method according to a preferred embodiment of the present invention.

FIG. 4 shows a flow chart of call setup method 94 performed at duplicating node 34. Method 94 establishes a call between subscriber unit 36 and second device 48. As indicated by ellipsis in FIG. 4, any number of conventional steps not relevant to the present invention may be performed by process 94. For example, such steps include the allocation of network resources so that a call path between subscriber unit 36 and second device 48 passes through duplicating node 34, the establishment of a call record, and the like. Within duplicating node 34, BSS-MAP like instructions are passed between earth terminal controller 54 and mobile switching center 56 (see FIG. 3) to route call data packets through packet router 72 (see FIG. 3). As indicated in step 96, process 94 allocates standard rate transcoders 50 (see FIG. 3) to each of the subscriber unit and second device half-calls. Step 96 is performed for all calls, whether or not the calls are being intercepted.

Eventually, call setup method 94 performs a query step 98. Step 98 determines whether the call is to be intercepted. Step 98 may evaluate a table (not shown) stored in mobile switching center 56 to make its determination. If the table includes an active flag associated with a subscriber unit identifier, then the call is to be intercepted. When step 98 determines that the call is not to be intercepted, program control may exit method 94. At this point the call has been set up and the call may commence.

When step 98 determines that the call is to be intercepted, step 100 activates the selective duplication process performed by selective duplication section 88 in earth terminal controller (ETC) 54 (see FIG. 3). Without step 100, selective duplication section 88 will refrain from duplicating incoming compressed call data and return compressed call data. After step 100, step 102 configures earth terminal controller 54 to route transcoder compression output for the second device (SD) half-call to a dummy buffer. This will prevent the compression output from overwriting the duplicated data stored in the packet buffer. After step 102, step 104 configures earth terminal controller 54 to route transcoder compression output for the subscriber unit half-call to a dummy buffer to prevent the overwriting of duplicated data.

Next, step 106 forms a connection to monitoring center 60 (see FIG. 2) if needed. In alternate embodiments, step 106 may form a connection to a recording device, or a permanent connection may be formed to monitoring center 60 so that step 106 may be omitted altogether. After step 106, step 108 connects the subscriber unit half-call, second device half-call, and the monitoring center connection together through conference bridge 90 (see FIG. 3).

After step 108, program control exits call setup process 94. The call has been established so that it may be unobtrusively intercepted. As discussed above, unobtrusive interception is accomplished by duplicating compressed call data while simultaneously decompressing the call data and routing the decompressed call data to monitoring center 60. The duplicated call data are transmitted in the subscriber unit and second device half-calls in lieu of recompressed call data.

Figure 5:
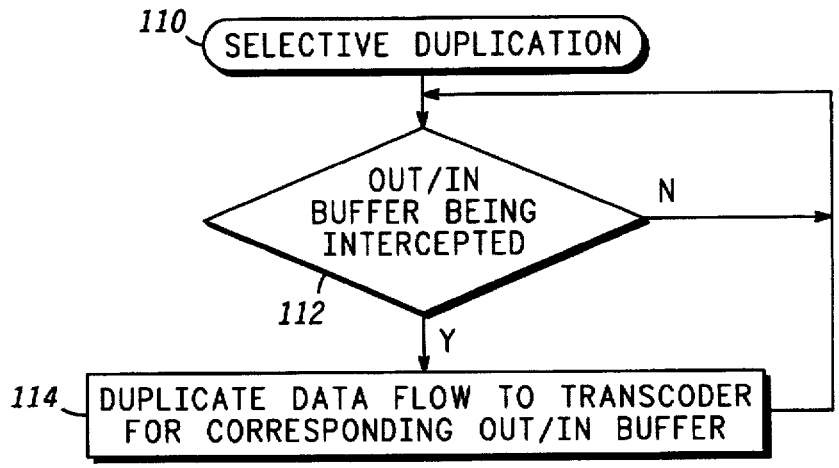
FIG. 5 shows a flow chart of a selective duplication method according to a preferred embodiment of the present invention.

FIG. 5 shows a flow chart of selective duplication method 110 performed at duplicating node 34, and particularly at selective duplication section 88 (see FIG. 3) of node 34. Selective duplication process 110 is performed during on-going calls when activated by call setup method 94 (see FIG. 4). Method 110 includes query step 112 which monitors OUT/IN addresses from packet router 72 (see FIG. 3) to determine whether compressed call data or return compressed call data appearing at the OUT/IN port of packet router 72 are associated with the intercepted call. If intercepted call data are not present, program control loops back to the beginning of process 110 to evaluate the next data appearing at the OUT/IN port.

When step 112 determines that compressed call data from an OUT/IN buffer are present, step 114 is performed. Step 114 duplicates the compressed data and causes the duplicated data to be stored back into packet router 72. In particular, the duplicated data are stored in an outgoing buffer assigned to the subscriber unit or second device half-calls. In particular, duplicated data from the subscriber unit half-call are stored in an outgoing buffer for the second device half-call, and duplicated data from the second device half-call are stored in an outgoing buffer for the subscriber unit half-call. Thus, selective duplication section 88 and process 110 perform the connection function normally performed by mobile switching center 56 (see FIG. 3). After step 114, program control loops back to the beginning of process 110 to evaluate the next data appearing at the OUT/IN port. Process 110 remains active until it is deactivated, which occurs when the intercepted call is terminated.

In summary, the present invention provides an improved radio telecommunication network and method for unobtrusive call interception via data duplication. The network and method described herein permit the use of maximal lossy data compression while intercepting calls unobtrusively. Calls are intercepted without inserting noticeable delay in the call paths that are being intercepted, and calls are intercepted without degrading voice signal quality. In addition, the network and method described herein may employ space-based nodes which need not otherwise route call paths through mobile switching centers located within the geographic jurisdiction of a country requesting a call interception.

The present invention has been described above with reference to preferred embodiments. However, those skilled in the art will recognize that changes and modifications may be made in these preferred embodiments without departing from the scope of the present invention. For example, those skilled in the art can configure process steps and gateway elements differently than described herein while achieving a substantially equivalent structure and method. These and other changes and modifications which are obvious to those skilled in the art are intended to be included within the scope of the present invention.

What is claimed is:

1. A method of unobtrusively intercepting a call routed through a radio link of a telecommunication network, the method comprising the steps of:
   a) establishing the call and a departing portion of a call path between a subscriber unit and a second device;
   b) receiving compressed call data from the subscriber unit at a network node, the compressed call data being received through the call path that includes an RF communication link;
   c) duplicating the compressed call data at the network node to obtain first compressed call data and second compressed call data;
   d) routing the first compressed call data from the network node toward the second device;
   e) routing the second compressed call data toward a monitoring center; and
   f) refraining from performing more than one compressing operation within the departing portion of the call path.

2. A method as recited in claim 1, further comprising the steps of:
   g) decompressing the first compressed call data; and
   h) decompressing the second compressed call data independently from step g.

3. A method as recited in claim 1, wherein step (b) includes the step of receiving the compressed call data from the subscriber unit at an in-view satellite located in outer space.

4. A method as recited in claim 3, wherein the in-view satellite is one of a plurality of satellites located in outer space; and
   each of the satellites has a radio coverage area extending over a fraction of earth's surface.

5. A method as recited in claim 3, further comprising the steps of:
   locating the network node proximate earth's surface; and
   transmitting the compressed call data from the in-view satellite to the network node.

6. A method as recited in claim 5, wherein:
   the in-view satellite has a coverage area; and
   the network node and the subscriber unit reside within the coverage area.

7. A method as recited in claim 1, further comprising the steps of:
   routing return compressed call data to the network node;
   duplicating the return compressed call data at the network node to obtain first return compressed call data and second return compressed call data;
   routing the first return compressed call data from the network node toward the subscriber unit; and
   routing the second return compressed call data toward the monitoring center.

8. A method of unobtrusively intercepting a call routed through a radio link of a telecommunication network, the method a comprising the steps of:
   a) establishing the call and a departing portion of a call path between a subscriber unit and a second device;
   b) obtaining call data at the subscriber unit;
   c) compressing the call data at the subscriber unit to obtain compressed call data;
   d) transmitting the compressed call data to a network node using an RF communication link;
   e) duplicating the compressed call data at the network node to obtain first compressed call data and second compressed call data;

f) routing the first compressed call data from the network node toward the second device;

g) routing the second compressed call data toward a monitoring center; and h) refraining from performing more than one compressing operation within the departing portion of the call path.

9. A method as recited in claim 8, wherein the compressing step is configured to achieve approximately maximal lossy compression.

10. A method as recited in claim 8, wherein step (c) includes the step of forming a stream of data occurring at a rate of less than 6400 bits/s from the compressed call data.

11. A method as recited in claim 8, further comprising the steps of:

obtaining return call data at the second device;

compressing the return call data to obtain return compressed call data;

routing the return compressed call data to the network node;

duplicating the return compressed call data at the network node to obtain first return compressed call data and second return compressed call data;

routing the first return compressed call data from the network node toward the subscriber unit; and routing the second return compressed call data toward the monitoring center.

12. A method as recited in claim 8, further comprising the steps of:

decompressing the first compressed call data; and decompressing the second compressed call data independently from step h).

13. A network allowing unobtrusive interception of a call established between a subscriber unit and a second device, the network comprising:

a plurality of network nodes in communication with one another, wherein one of the network nodes is in radio communication with the subscriber unit, one of the network nodes is in communication with the second device, and one of the network nodes is a duplicating node, wherein the duplicating node comprises:

means for duplicating compressed call data received from the subscriber unit into first compressed call data and second compressed call data;

first routing means, coupled to the duplicating means, for routing the first compressed call data toward the second device and for refraining from performing more than one compressing operation within a departing portion of a call path; and second routing means, coupled to the duplicating means, for routing the second compressed call data toward a monitoring center.

14. A radio telecommunication network as recited in claim 13, wherein:

the first routing means routes the first compressed call data along a first call path;

the second routing means routes the second compressed call data along a second call path;

the network further comprises means for decompressing the first compressed call data within the first call path; and the network further comprises means for decompressing the second compressed call data within the second call path.

15. A radio telecommunication network as recited in claim 13, wherein:

the one node in radio communication with the subscriber unit is located in a satellite residing in outer space; and the duplicating node resides proximate earth's surface.

16. A radio telecommunication network as recited in claim 13, wherein:

the one node in radio communication with the subscriber unit is located in a satellite residing in outer space; and the duplicating node resides in any network node in outer space.

17. A network allowing unobtrusive interception of a call established between a subscriber unit and a second device, the network comprising:

a plurality of network nodes in communication with one another, wherein one of the network nodes is in radio communication with the subscriber unit, one of the network nodes is in communication with the second device, and one of the network nodes is a duplicating node, wherein the duplicating node comprises:

duplicator capable of duplicating compressed call data received from the subscriber unit into first compressed call data and second compressed call data;

first router, coupled to the duplicator, capable of routing the first compressed call data toward the second device and for refraining from performing more than one compressing operation within a departing portion of a call path; and second router, coupled to the duplicator, for routing the second compressed call data toward a monitoring center.

* * * * *

UNITED STATES PATENT AND TRADEMARK OFFICE
CERTIFICATE OF CORRECTION

PATENT NO. : 5,710,971
DATED : January 20, 1998
INVENTOR(S) : Peter J. Armbruster et al.

It is certified that error appears in the above-identified patent and that said Letters Patent is hereby corrected as shown below:

Add inventor, Joseph O. Lester, to list of Inventors on the Title page of the patent.

Signed and Sealed this

Twelfth Day of June, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 5,710,971
DATED : January 20, 1998
INVENTOR(S) : Peter J. Armbruster et al.

It is certified that error appears in the above-identified patent and that said Letters Patent is hereby corrected as shown below:

Add inventor, Joseph O. Lester, to list of Inventors on the title page of the patent.

Signed and Sealed this

Seventeenth Day of July, 2001

*Attest:*

*Nicholas P. Godici*

*Attesting Officer*

NICHOLAS P. GODICI
*Acting Director of the United States Patent and Trademark Office*